United States Patent Office 3,324,010
Patented June 6, 1967

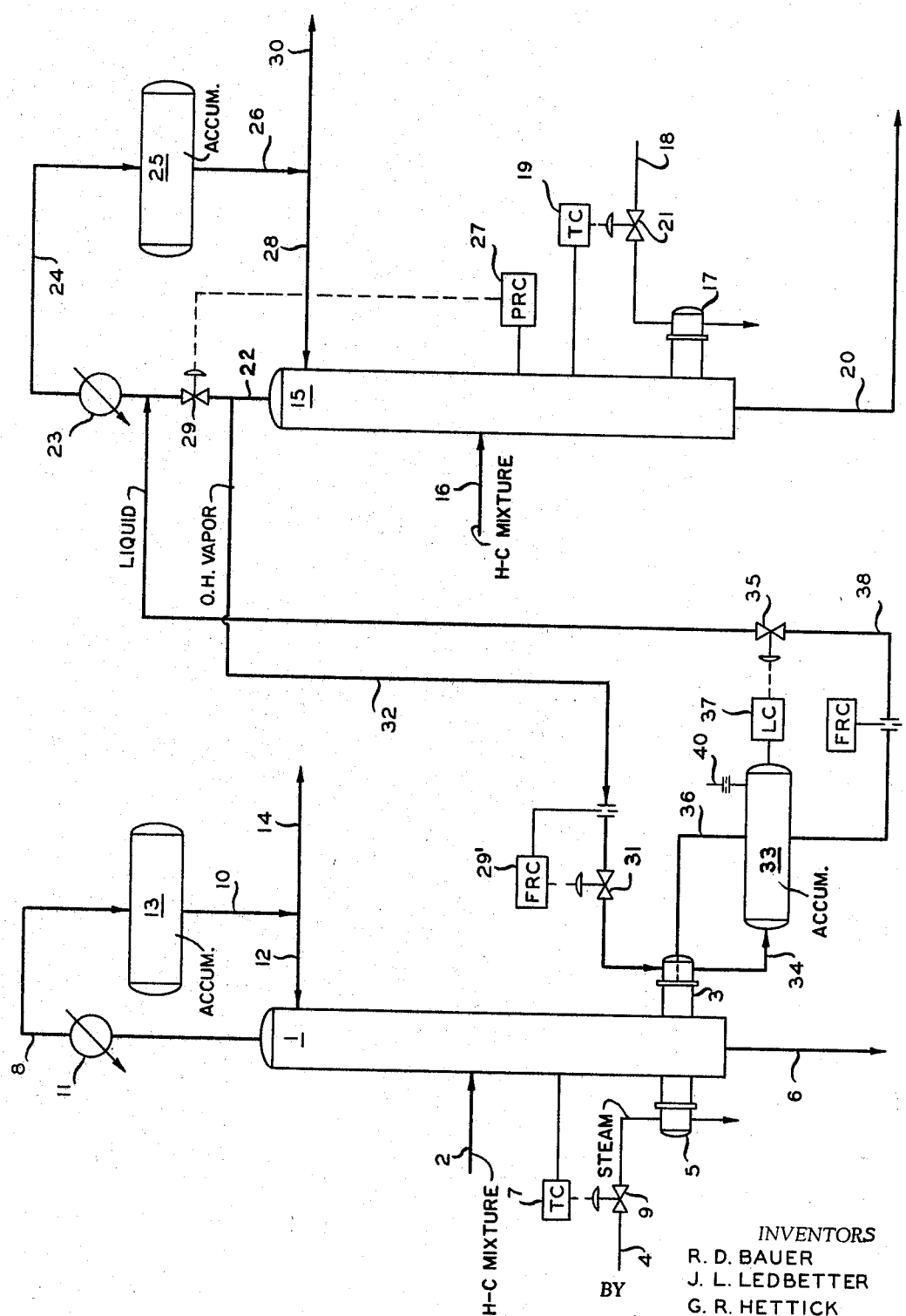

3,324,010
EMPLOYING OVERHEAD AS REBOIL HEAT
WITH FLOW CONTROL
Robert D. Bauer, John L. Ledbetter, and George R. Hettick, Bartlesville, Okla., assignors to Phillips Petroleum Company, a corporation of Delaware
Filed Sept. 30, 1963, Ser. No. 312,692
8 Claims. (Cl. 203—1)

This invention relates to method and apparatus for the separation of hydrocarbons. In one aspect this invention relates to control of separation column reboilers.

In the stabilization and concentration of hydrocarbon fractions, a hydrocarbon stream is fed to a separation column wherein the mixture is separated into the desired fractions. In operation of such columns, heat is added to the lower portion of the column to drive off the lighter materials as a vaporous fraction and the heavier materials remain as liquid. The vaporous fraction is withdrawn from the column and condensed to form an overhead liquid product and a liquid is withdrawn as bottoms product. Separation columns operate at various temperatures depending upon the separation desired and the components desired in either of the product streams. In the operation of such columns, the utilities of both heating and cooling are generally required. To operate separation columns more efficiently, the manufacturer is always concerned with the cost of his utilities and is constantly striving to reduce costs. When two separating columns are operating at different temperatures, the overhead of the high temperature column has been used to reboil the low temperature column. In this regard, the overhead vapors are contacted indirectly with the lower portion of the low temperature column. This contacting can be effected in an external shell-tube heat exchanger or in a shell-tube type heat exchanger extending from the lower portion of the low temperature column, wherein liquid from the lower portion of the low temperature column passes over the outside of the tubes, producing vapors, and the oeverhead vapors from the high temperature column pass through the tubes, and condense in the tubes. This method of heat exchange is economically attractive. However, in the past this method has been operated by utilizing flooded conditions in the tubes in the reboiler, or by passing a mixture of liquid and vapor therefrom, or both. These methods of operation lead to unstable heat transfer and nonefficient use of the heat exchange relationship. When the tubes of the tube bundle are operated under flooded conditions, the liquid covering the tubes greatly reduces the surface area available for the heat transfer, makes the heat transfer variable and cyclic, and limits the capacity of the reboiler. When vapor and liquid are both present in the effluent from the tube bundle, the capacity of the tube bundle is exceeded and the result is an unsteady heat transfer and surges in the operation of the column which causes a very serious problem of operation.

According, it is an object of this invention to provide efficient reboiling of separation columns. It is another object of this invention to provide a control system for the reboiler of a separation column. Still another object of this invention is to provide an improved method of reboiling a separation column. Still another object of this invention is to provide a control system for utilizing an overhead vapor stream of a separation column in the reboiler of another separation column without operating under flooded conditions or having vapor and liquid both in the reboiler effluent.

In accordance with this invention, a controlled quantity of overhead vapor from a high temperature operating separation column is heat exchanged, using indirect heat exchange, with the lower portion of a low temperature operating separation column wherein this controlled quantity of overhead vapor is totally condensed to prevent vapor from exiting the tubes of the exchanger, and the resulting liquid is controllably removed to prevent flooding of the tubes of the heat exchanger.

The term separation column as used throughout this disclosure and claims includes all columns used to make a separation of separable liquids (e.g., hydrocarbons) such as distillation columns, fractional distillation columns, absorbers, dephlegmators, etc.

This invention will now be described more fully with reference to the accompanying drawing which is a schematic flow scheme showing apparatus of an embodiment of this invention.

Referring to the drawing, a mixture of hydrocarbons to be separated is introduced to fractionating column 1 through conduit 2. A constant quantity of heat is added to column 1 through first reboiler 3 associated with the lower portion of column 1. A variable quantity of heat is added to column 1 through second reboiler 5 associated with the lower portion of column 1. A heating fluid, such as steam, is introduced to reboiler 5 through conduit 4. The quantity of heating fluid passing through conduit 4 is controlled in response to a temperature measurement taken in the lower portion of column 1 by temperature controller means 7 which, in turn, manipulates valve 9 in conduit 4 to regulate the flow therethrough. Bottoms product is removed from column 1 through conduit 6. Vapor is removed from column 1 through conduit 8 and passed through condenser 11 into accumulator 13. Liquid is withdrawn from accumulator 13 through conduit 10. A portion of the liquid in conduit 10 passes to column 1 as reflux through conduit 12. The remaining portion of liquid in conduit 10 is withdrawn through conduit 14 as overhead product.

A mixture of hydrocarbons to be separated into desired fractions is introduced into fractionation column 15 through conduit 16. Heat is added to column 15 by reboiler 17 associated with the lower portion thereof. A heating medium, such as steam, is introduced into reboiler 17 through conduit 18. The amount of heating fluid passing through conduit 18 is controlled in response to a temperature measurement taken in the lower portion of column 15 by temperature controller 19 which manipulates valve 21 in conduit 18. Bottoms product is removed from column 15 through conduit 20. Overhead vapors are removed from column 15 through conduit 22, conduit 24, and passed through condenser 23 into accumulator 25. The quantity of vapor passing through conduit 24 is controlled in response to a pressure-measurement taken in column 15, preferably below the feed thereto, by pressure-recorder controller means 27 which manipulates valve 29 in conduit 24. Liquid is withdrawn from accumulator 25 through conduit 26. A portion of the liquid in conduit 26 passes to column 15 through conduit 28 as reflux. The remaining portion of liquid in conduit 26 is removed through conduit 30 as overhead product.

A portion of the vapor in conduit 22 is passed to reboiler 3 of column 1 through conduit 32. The flow of vapor through conduit 32 is maintained constant by flow recorder controller 29' manipulating valve 31 in conduit 32. The vapor entering reboiler 3 through conduit 32 is condensed and withdrawn as liquid through conduit 34 and passed to accumulator 33. Conduit 36 communicates with reboiler 3 and accumulator 33 to equalize pressures therein. Liquid is withdrawn from accumulator 33 through conduit 38 and introduced into conduit 24. The flow of liquid through conduit 38 is regulated by valve 35 in said conduit which is manipulated by level controller means 37 associated with accumulator 33. Non-condensibles are vented from accumulator 33 through conduit 40 having a restriction orifice therein.

EXAMPLE

The following is a material balance around two fractionation columns operating in accordance with this invention. With reference to the drawing, column 1 is a fractionator removing isopentanes and lighter material as overhead product from heavier hydrocarbons. Column 1 operates at a top temperature of 170° F., and 45 p.s.i.g. and a bottom temperature of 185° F. Feed introduced through conduit 2 comprises 9,070 barrels per day. Overhead product removed through conduit 14 comprises 4,090 barrels per day. Bottoms removed through conduit 6 comprises 4,980 barrels per day. Column 15 is a fractionator wherein isoheptanes and lighter materials are removed from heavier hydrocarbons. The feed to this column through line 16 comprises 7,550 barrels per day. Column 15 operates at a top temperature of 258° F., and 25 p.s.i.g., and a bottom temperature of 320° F. Overhead product withdrawn through conduit 30 comprises 3,040 barrels per day. Bottoms product withdrawn through conduit 20 comprises 4,510 barrels per day. A portion of column 2 overhead vapor comprising 90,000 pounds per hour at 250° F. (replacing about 25,000 pounds per hour of steam normally added by way of conduit 4) is passed through conduit 32 to reboiler 3 of column 1. The overhead portion is totally condensed in reboiler 3 and returned through conduit 38 to the overhead of column 15 at 250° F.

The compositions in volume percent of the various streams are as follows:

| Component | Stream | | | | | |
|---|---|---|---|---|---|---|
| | 2 | 14 | 6 | 16 | 30 | 20 |
| Normal butane | 2.6 | 5.8 | | | | |
| Isopentanes | 47.8 | 91.8 | 11.8 | | | |
| Normal pentane | 48.5 | 2.2 | 86.5 | | | |
| Isohexanes | 1.1 | 0.2 | 1.7 | | | |
| Normal hexanes | | | | 3.3 | 8.6 | |
| Isoheptanes | | | | 40.7 | 74.4 | 17.7 |
| Normal heptane | | | | 19.8 | 13.5 | 24.1 |
| Isooctanes and heavier | | | | 36.2 | 3.5 | 58.2 |

This example shows a savings of 25,000 pounds per hour of steam by using the heat of the overhead vapors of column 15 to reboil column 1. Also, the temperature in the reboiler of column 1 effects condensation of this overhead vapor from column 15, thus saving cooling requirements in condenser 23. The control of the return of condensed overhead from the reboiler back to column 15 in response to liquid level controller 37 allows complete condensation of the overhead vapors in reboiler 3, a total liquid effluent to be withdrawn therefrom, and prevents reboiler 3 from flooding. The maximum heat exchange was obtained and the columns operated under stable conditions.

The above description of the drawing and example are for descriptive purposes only and are not intended in any way to limit the invention.

Many variations and modifications of this invention will be apparent to one skilled in the art, in view of the foregoing disclosure, that will come within the spirit and scope of the invention.

What is claimed is:

1. In the method of heat exchanging the lower portion of a first separation column with the overhead vapor of a second separation column wherein said overhead vapor is condensed in a reboiler associated with said first column and returned to said second column, the improvement comprising:
    controlling the flow of said overhead vapor to said first column at a constant rate to maintain a fixed heat input to said first column; and
    controlling the flow rate of said condensed overhead in response to the quantity condensed.

2. In the method of reboiling a first separation column with at least a portion of the overhead vapor of a second separation column operating at a higher temperature than said first column wherein said overhead vapor is condensed in a reboiler associated with said first column, accumulated, and returned to the overhead of said second column, the improvement comprising:
    controlling the flow rate of said overhead vapor portion to said first column constant; and
    controlling the return of said condensed overhead in response to the liquid level of accumulated condensed overhead.

3. The method of adding a constant amount of reboil heat to a first separation column which comprises:
    passing at least a portion of overhead vapor from a second separation column operating at a temperature greater than said first column at a constant flow rate to the reboiler of said first column;
    condensing all of said passed overhead vapor in said reboiler;
    passing said condensed vapor to an accumulator; and
    withdrawing and passing liquid from said accumulator to the remaining portion of said second column overhead at a flow rate in response to the liquid level in said accumulator.

4. The method of claim 3 wherein said columns are separating hydrocarbon fractions, the first removing isopentanes and lighter materials and the second removing isoheptanes and lighter materials.

5. The method of claim 3 wherein said columns are separating hydrocarbon fractions, the first removing isobutane and lighter materials and the second removing normal hexane and lighter materials.

6. The method of claim 3 wherein said columns are separating hydrocarbon fractions, the first removing isobutane and lighter materials and the second removing cyclohexane and lighter materials.

7. The method of claim 3 wherein said columns are separating hydrocarbon fractions, the first removing isobutane and lighter materials and the second removing methylcyclopentane and lighter materials.

8. Apparatus for the separation of hydrocarbon fractions which comprises:
    a first separation column;
    a reboiler in said first column;
    a second separation column;
    first conduit means communicating with the upper portion of said second column for removing overhead vapor;
    second conduit means communicating with said first conduit means and said reboiler;
    means associated with said second conduit means for maintaining a constant flow therethrough;
    an accumulator;
    third conduit means communicating with said reboiler and said accumulator;
    fourth conduit means communicating with said accumulator and said first conduit means;
    flow regulating means in said fourth conduit;

a liquid level controller associated with said accumulator; and means communicating with said controller and said regulating means for regulating the flow in said fourth conduit means by manipulating said regulating means in response to the liquid level in said accumulator.

References Cited

UNITED STATES PATENTS

| | | | |
|---|---|---|---|
| 2,357,113 | 8/1944 | Houghland et al. | 202—160 |
| 2,504,464 | 4/1950 | Stanley | 196—132 |
| 2,805,984 | 9/1957 | St. Clair | 203—25 |
| 2,988,894 | 6/1961 | Van Pool et al. | 202—160 X |
| 3,085,153 | 4/1963 | Morgan | 203—3 |
| 3,115,445 | 12/1963 | Kleiss et al. | 202—160 |
| 3,232,849 | 1/1966 | Renberg | 202—154 |
| 3,281,337 | 10/1966 | Zahnstecher et al. | 202—160 X |

FOREIGN PATENTS 1,010,057  6/1957  Germany.

NORMAN YUDKOFF, *Primary Examiner.*

F. E. DRUMMOND, *Assistant Examiner.*